Jan. 12, 1965 G. D. NOYES 3,165,282
PNEUMATIC MISSILE GUIDANCE SYSTEM
Filed Feb. 7, 1962 2 Sheets-Sheet 1

INVENTOR.
Gregory D. Noyes.
BY Harry R. Dumont
ATTORNEY.

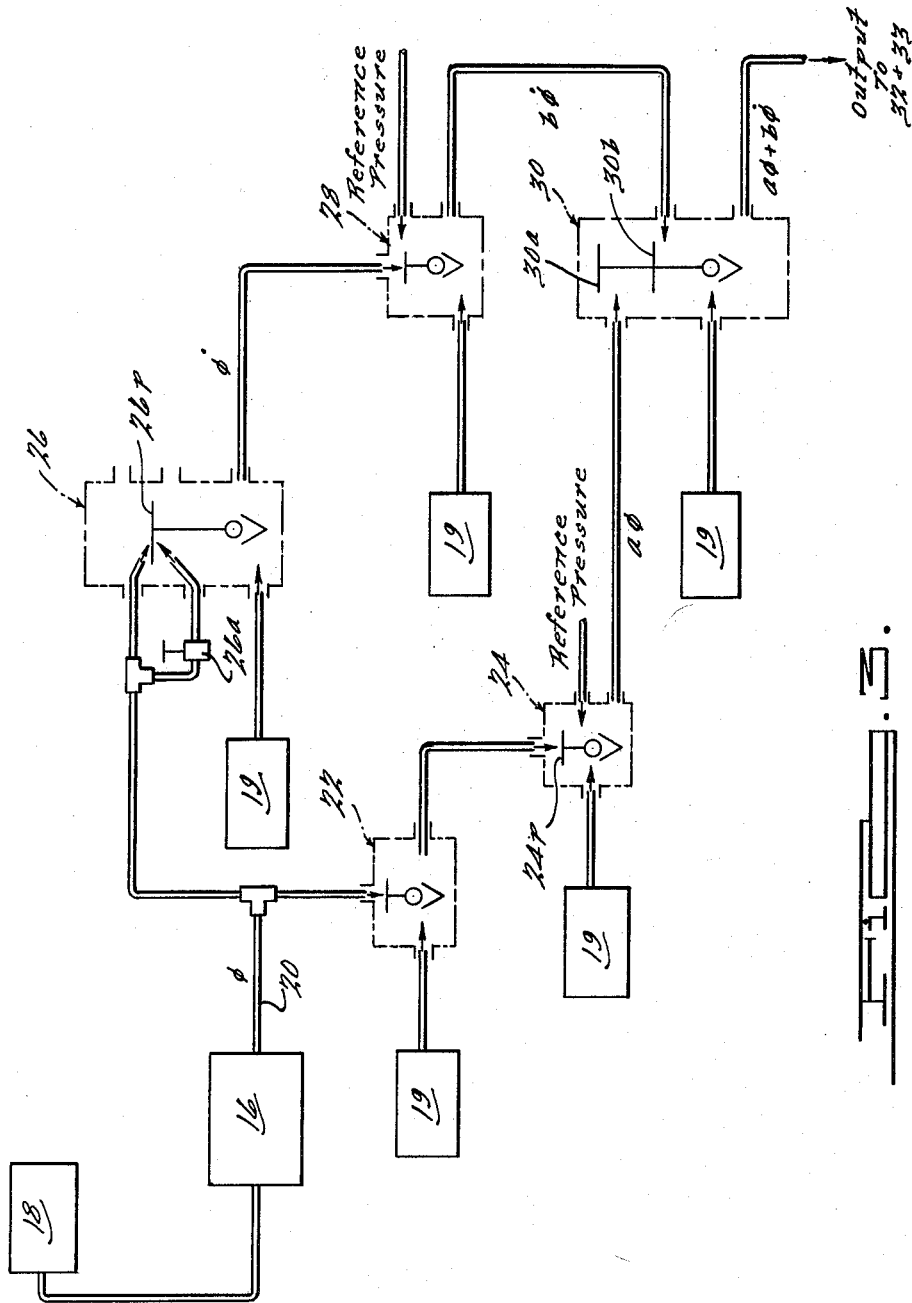

United States Patent Office 3,165,282
Patented Jan. 12, 1965

3,165,282
PNEUMATIC MISSILE GUIDANCE SYSTEM
Gregory D. Noyes, Troy, Mich., assignor to Chrysler Corporation, Highland Park, Mich., a corporation of Delaware
Filed Feb. 7, 1962, Ser. No. 171,667
8 Claims. (Cl. 244—79)

This invention relates generally to a system for guiding missiles during their flight and, more particularly, to a guidance system of the pneumatically controlled and operated type.

The present invention assumes that the missile's flight is being accomplished and that the missile is to maintain prescribed attitudes during flight. In the course of its flight, the missile may be subjected to unpredictable disturbances including winds, and to known missile parameters such as missile geometry, weight and drag characteristics. It is therefore necessary to provide an attitude control system to maintain the missile along its predetermined flight path and to compensate for external forces which apply torques to the missile and tend to cause it to deviate from that path.

Accordingly, it is an object of this invention to provide an improved guidance control system for a missile which operates entirely with pneumatic control components in a manner which eliminates the need for transducing elements and for an electrical power supply on the missile.

It is an additional object of this invention to provide an improved attitude deviation sensing apparatus of the pneumatic type.

It is a further object of this invention to provide a pneumatic attitude guidance system whose time constant can be readily adjusted by adjusting the ratio between poppet opening and downstream orifice area in each pneumatic computing element.

A feature of this invention is the provision of a pneumatic attitude guidance system which is readily altered to provide additional computational functions such as integration, subtraction, square root and the like.

In accordance with the foregoing objects and others, the accompanying drawings are designed to facilitate a more rapid and complete understanding of my invention. Referring to the drawings:

FIGURE 3 is a diagrammatic showing of the pneumatic control system illustrating the pneumatic computer elements therein.

Figure 1:
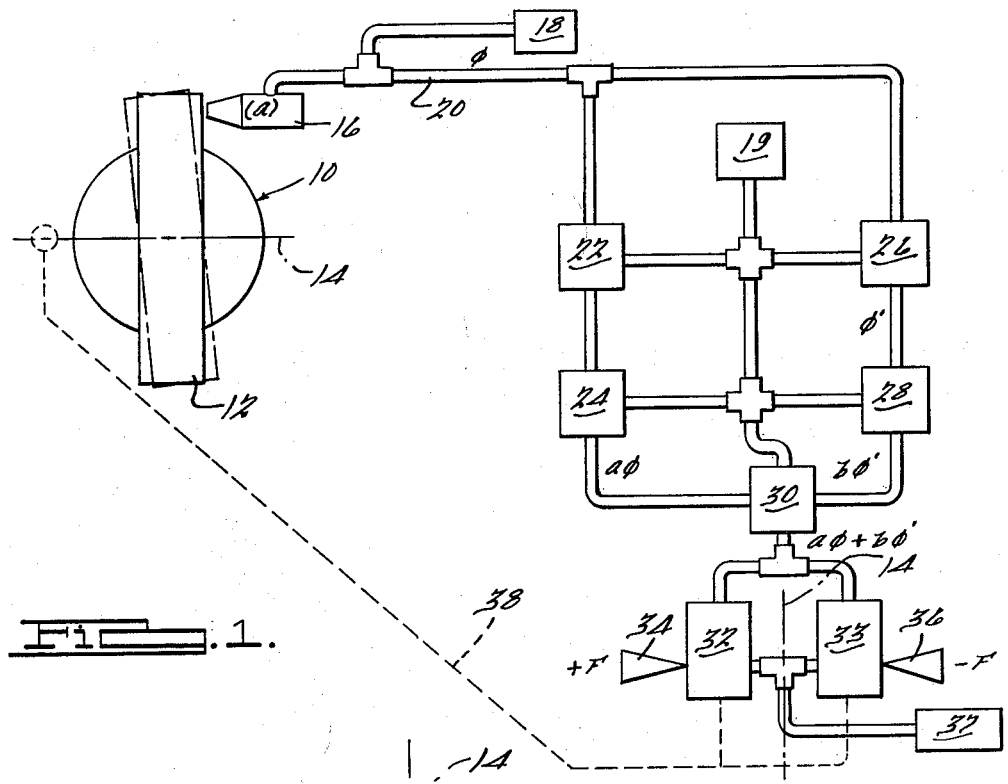
FIGURE 1 is a functional diagram of the pneumatic guidance control system.

FIGURE 1 shows the attitude sensing element herein embodied as a one degree-of-freedom gyroscope 10 having a rotor 12. Rotor 12 has its spin axis coincident with the longitudinal axis of the missile as indicated by a dot-dash line 14. In practice a two-degree-of-freedom gyroscope might also be employed to provide attitude deviation sensing in two planes to sense yaw and pitch, respectively. To simplify the explanation, the present embodiment will be explained with reference to attitude control in the pitch plane only. It will be seen that displacement of the rotor 12 will occur in response to deviation of the missile from its predetermined attitude. Otherwise stated, the torques applied to the missile by external forces will cause the gyroscope 10 to precess with the displacement of the spinning rotor 12 being a measurable quantity which is a function of the missile's attitude error. The rotor 12 is also shown in dot-dash line configuration to illustrate one possible moved position.

A pneumatic sensing nozzle 16 is mounted with its longitudinal axis parallel to the longitudinal axis 14 of the missile. Nozzle 16 is connected to a source of constant pneumatic pressure 18 and directs a constant pressure jet of air against the lower surface of rotor 12. Sensing nozzle 16 measures the amount of displacement of rotor 12 from its normal position utilizing the known principle that nozzle pressure has a direct relationship to clearance. Gas flowing through nozzle 16 is directly proportional to flow passage area provided by the opening in nozzle 16 and to pressure differential. By maintaining a constant upstream pressure, the area becomes the controlling factor. If the area of the nozzle flow passage is greater than the area formed by the proximity of the nozzle to a solid surface, the smaller area is the governing factor. The escape area is directly proportional to the clearance and area change is linear to clearance change. The pneumatic output signal from output conduit 20 is therefore a measure of displacement of the rotor 14 and, hence, of the missile from its predetermined attitude. The displacement signal $\phi$ from the gyroscope 12 is applied to a proportioning relay 22 and to an amplifier 24 to provide a pneumatic signal $a\phi$ which is a term representing the measure of displacement with respect to time.

The pneumatic signal $\phi$ is also applied to a differentiating relay 26 which provides an output $\dot{\phi}$ which is a measure of the change of displacement with respect to time. The pneumatic signal $\dot{\phi}$ is then applied to an amplifier 28 which provides an amplified output $b\dot{\phi}$. The output pneumatic signals $a\phi$ and $b\dot{\phi}$ are in accordance with a preset amplification ratio ($a$ for the $\phi$ term and $b$ for the $\dot{\phi}$ term). The pneumatic signals $a\phi$ and $b\dot{\phi}$ are then routed into summing relay 30. The output pressure of summing relay 30 is representative of the direction and magnitude of the force which must be applied to counteract the initial torque applied to the missile as indicated by the displacement of the gyroscope rotor 12 about its spin axis. The output of the summing relay 30 is directly applied to the control ports of servo regulators 32 or 33. Servo regulators 32 and 33 by internal force balancing will generate a plus force (+F) or a minus force (−F) proportional to the input from the summing relay 30. Servo regulators 32 and 33 may be of the type shown and described in U.S. application No. 156,332, "Servo Regulator Valve" filed on December 1, 1961 in behalf of John S. Gates, Thomas V. Ballard, and Gregory D. Noyes, and of common ownership herewith. A pair of thrust jets 34 and 36 are mounted on the body of the missile, coplanar and perpendicular to the longitudinal axis of the missile as indicated by dotted line 14. Jets 34 and 36 are connected to a pressure supply 37 and are adapted to provide corrective forces to compensate for the torques which caused the missile to deviate from its predetermined attitude. As indicated by the dotted line 38, the body fixation of the gyroscope 10 and the thrust jets 34, 36, with respect to the horizontal axis 14 of the missile, complete the control loop of a purely mechanical-pneumatic attitude control system for the missile.

Figure 2:
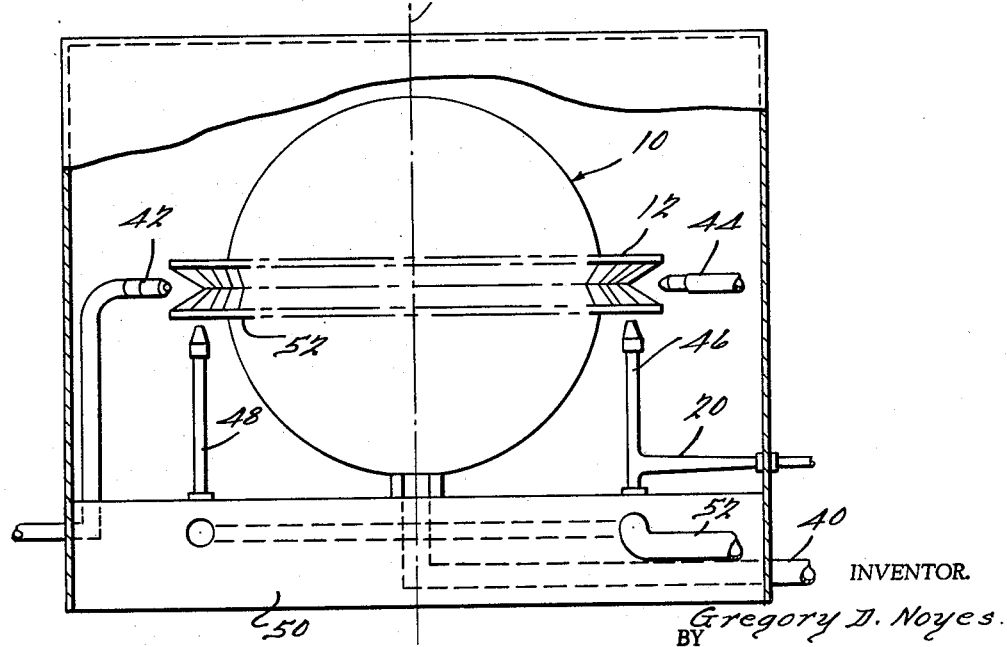
FIGURE 2 is an elevation of the attitude deviation sensing apparatus.

FIGURE 2 shows the detail of the attitude deviation sensing apparatus. Gyroscope 10 is mounted in the manner indicated heretofore in connection with FIGURE 1 with reference to the horizontal axis 14 of the missile. Gyroscope 10 is of the air bearing supported type with an air bearing pressure supply admitted through conduit 40. Rotor 12 is provided with a rotative torque in a manner well known in the art from spin nozzles 42 and 44. Spin nozzles 42 and 44 are coupled to a source of pressurized gas, not shown. A sensing nozzle 46 and a balancing nozzle 48 are mounted on base 50 with their axes parallel to the axis 14. Nozzles 46 and 48 are further connected through an internal channel in base 50 and conduit 52 to source of constant pressure 18. The openings of nozzles 46 and 48 are directed at points diametrically opposite and equidistant from the axis 14 on a lower planar surface 54 on rotor 12. It will thus be seen that rotor 12 functions essentially as a free floating body. When it is subjected to slight torques, these are sensed by sensing nozzle 46, and any disturbing torques applied are balanced out simply and quickly by means of the equal and opposite force applied by balancing nozzle 48.

FIGURE 3 shows the elements of the pneumatic computer system utilized in the present invention which operate from a common source of constant pneumatic pressure 19. The specific pneumatic computer elements, namely, the proportioning relay 22, amplifiers 24 and 28, differentiating relay 26 and summing relay 30 are components well known to the pneumatic art or in the closely related hydraulic art. To facilitate the description of the present invention with respect to these components which, in their detail of construction, lie outside the scope of the present invention, they will therefore be shown in diagrammatic form. All the above listed components are currently commercially produced and available from the Moore Products Co. of Philadelphia, Pa.

The pneumatic displacement signal $\phi$ is obained from the sensing nozzle 16 and forwarded through output conduit 20 for computation of the displacement term $a\phi$ and the rate of displacement term $b\dot{\phi}$. For the computation of the former term the pneumatic signal $\phi$ is applied to proportioning relay 22. The function of the proportioning relay 22 is to match the pneumatic $\phi$ signal to the input pressure range requirements of the pneumatic amplifier 24 for the $a$ term. The output of the proportioning relay 22 is hen forwarded to amplifying relay 24. A reference pressure is utilized to which is compared the input pressure $\phi$. A separate supply pressure which is greater than the maximum $a\phi$ pressure is fed into the amplification relay 24. The relation between the $\phi$ input signal and the reference pressure causes differential movement of a poppet 24p. The output pressure from amplifier 24 is then equal to the input pressure $\phi$ multiplied by the preset amplification ratio $a$ for the $a\phi$ term.

For computation of the rate of displacement term $b\dot{\phi}$ the pneumatic signal $\phi$ is applied to each side, upper and lower of a piston 26p. The gas passage into the chamber on the lower side of the piston is restricted by a variable orifice 26a. When a static pressure position signal is being fed to the two sides of the piston 26p, no differential pressure exists across it and the piston 26p is at rest. When a dynamic pressure position signal is being fed to the piston 26p, a differential pressure exists across it which is a function of the dynamic rate. The piston 26p is caused to move by the pressure differential whereby the output pressure from the piston controlled poppet is changed. When no differential pressure again exists across piston 26p, it comes to rest. The output pressure signal from differentiating relay 26 is the $\dot{\phi}$ term. The $\dot{\phi}$ signal is applied to the amplifier 28 which is essentially similar in mode of operation to amplifier 24, hereinbefore described. The pneumatic signals representative of the $a\phi$ and $b\dot{\phi}$ terms are fed into summing relay 30. Summing relay 30 has two pistons 30a and 30b connected in series. The induced movement of the poppet is caused by the sum of the forces applied on pistons 30a and 30b by pneumatic input signals $a\phi$ and $b\dot{\phi}$, respectively. Each input signal is applied to the same relative area of its respective piston. The output pressure of summing relay 30 is equal to the sum $a\phi$ and $b\dot{\phi}$. The supply pressure utilized is higher than the maximum possible for the pressure sum.

Preliminary to operation, the pneumatic computer system is nulled at a mean pressure level so that plus and minus displacements of the gyro rotor 12 cause a suitable pressure range output. The maximum pressure of this range represents the positive deflection limit. The minimum pressure represents the minus deflection limit. It will thus be seen that, I have provided a completely pneumatic attitude control system from which the requirement for transducing means has been eliminated. Additionally, the deviation sensing apparatus has broad limits of operational pressure. The allowable displacement of the gyro rotor can vary widely in any sensed plane. The time constant of the differentiating relay 26 may be selectively adjusted from milliseconds to several seconds by simple adjustment of the variable orifice 26a. The gain values of the amplifiers can be varied more than 500:1 with respect to each other by adjustment of their respective ratio relationship to their common reference pressure. The gain may be further increased by varying the reference pressure between the amplifiers 24 and 28. The summing output pressure from summing relay 30 can be varied by adjusting the ratio between poppet opening and orifice area.

It will be obvious that various changes may be made by those skilled in the art in the details of the embodiment disclosed in the drawings and described in detail above within the principle and scope of the invention.

I claim as my invention:

1. A system for maintaining the predetermined attitude of a missile in flight comprising control means movable from a normal position in response to a force causing deviation of the missile from its predetermined attitude, pneumatic sensing means mounted stationary on the missile and operable to produce a first pneumatic signal representative of the displacement of said control means, pneumatic balancing means operatively connected to said control means and cooperable with said sensing means to maintain the balance of said control means in its normal position, means operatively connected to said pneumatic sensing means for differentiating the first pneumatic signal to produce a second pneumatic signal representative of the rate of displacement of said control means, means operatively connected to said pneumatic sensing means and said pneumatic differentiating means for pneumatic summing of the first and second pneumatic signals, pneumatic servo regulator means operatively connected to the output of said summing means, and a pair of pneumatic thrust jets fixed to the missile, operatively connected to and controlled by said servo regulator means for providing a corrective force to the missile in a direction and magnitude opposite to the initial force causing deviation of the missile.

2. A pneumatic system for maintaining the predetermined attitude of a missile in flight comprising control means movable in response to a force causing deviation of the missile from its predetermined attitude, pneumatic sensing means mounted stationary on the missile and operable to produce a first pneumatic signal representative of the displacement of said control means, pneumatic balancing means operatively connected to said control means and cooperable with said sensing means to provide a balancing force to said control means during sensing, pneumatic means operatively connected to said sensing means for differentiating said first signal to produce a second pneumatic signal representative of the rate of displacement of said control means, pneumatic means for amplifying the first and second signals, a summing pneumatic relay for adding the first and second amplified signals, pneumatic servo regulator means operatively connected to the output of said summing means, and pneumatic thrust means fixed on the missile, operatively connected to and controlled by said servo regulator means for providing a corrective force to the missile in a direction and magnitude opposite to the initial force causing deviation of the missile.

3. A pneumatic system for maintaining the predetermined attitude of a missile in flight comprising a rotor of a gyroscope mounted for rotation in a normal plane about the longitudinal axis of the missile, a sensing nozzle mounted on the missile and oriented to direct a pneumatic jet against said rotor, a balancing nozzle mounted on the missile and oriented to direct a pneumatic jet against said rotor to provide a force opposing and equal to that provided by said sensing nozzle for maintaining said rotor in its balance condition, a source of constant pneumatic pressure operatively connected to said sensing nozzle and said balancing nozzle, an output conduit intermediate said sensing nozzle and said source of constant pneumatic pressure, said sensing nozzle operable to produce through said output conduit a pneumatic output signal responsive to a torque received by the missile and representative of the displacement of said rotor from its normal plane, pneumatic means connected to said output conduit for differentiating the first pneumatic signal to produce a second pneumatic signal representative of the rate of displacement of said rotor, pneumatic means connected to said output conduit and said differentiating means for summing the first and second pneumatic signals, pneumatic servo regulator means operatively connected to the output of said summing means, and a pair of laterally and oppositely directed pneumatic thrust jets fixed on the missile, operatively connected to and controlled by said servo regulator means for providing a corrective torque to the missile in a direction opposite and magnitude equal to the initial torque received by the missile.

4. A pneumatic system for maintaining the predetermined attitude of a missile in flight comprising a rotor of a gyroscope mounted for rotation in a normal plane about the longitudinal axis of the missile, a sensing nozzle mounted on the missile and oriented to direct a pneumatic jet against said rotor, a source of constant pneumatic pressure operatively connected to said sensing nozzle, an output conduit intermediate said sensing nozzle and said source of constant pneumatic pressure, said sensing nozzle operable to produce through said output conduit a pneumatic output signal responsive to a torque received by the missile and representative of the displacement of said rotor from its normal plane, a balancing nozzle connected to said source and applying a force equal to and opposite the force directed by said sensing nozzle against said rotor during sensing pneumatic means connected to said output conduit for differentiating the first pneumatic signal to produce a second pneumatic signal representative of the rate of displacement of said rotor, pneumatic means operably connected to said output conduit and said differentiating means for summing the first and second pneumatic signals, servo regulator means operatively connected to the output of said summing means, and a pair of laterally and oppositely directed thrust jets fixed on the missile, operatively connected to and controlled by said servo regulator means for providing a corrective torque to the missile in a direction opposite and magnitude equal to the initial torque received by the missile.

5. A pneumatic system for maintaining a predetermined attitude of a missile in flight comprising a rotor of a gyroscope mounted for rotation in a normal plane about a spin axis coincident with the longitudinal axis of the missile, a balancing nozzle and a sensing nozzle mounted on the missile and oriented to direct pneumatic jets against said rotor in a force balanced relationship, a source of constant pneumatic pressure operatively connected to said nozzles, an output conduit intermediate said position sensing nozzle and said source of constant pneumatic pressure, said sensing nozzle operable to produce through said output conduit a first pneumatic output signal responsive to a torque received by the missile and representative of the displacement of said rotor from its normal plane, said sensing and balancing nozzles operable to provide a constant balancing force to said rotor to maintain said rotor in a balanced condition before, during, and after receipt of a torque by said missile, pneumatic means connected to said output conduit for differentiating said first pneumatic signal to produce a second pneumatic signal representative of the rate of displacement of said rotor, pneumatic means connected to said output conduit and said differentiating means for summing the first and second pneumatic signals, servo regulator means operatively connected to the output of said summing means and a pair of laterally and oppositely directed thrust jets fixed on the missile, operatively connected to and controlled by said servo regulator means for providing a corrective torque to the missile in a direction opposite and magnitude equal to the initial torque received by the missile.

6. A pneumatic system for maintaining the predetermined attitude of a missile in flight comprising a rotor of a gyroscope mounted for rotation in a normal plane about a spin axis coincident with the longitudinal axis of the missile, said rotor having a planar surface normal to its axis of rotation, a balancing nozzle and a sensing nozzle mounted on the missile and oriented to direct pneumatic jets against said planar surface of said rotor in a force balanced relationship, a source of constant pneumatic pressure operatively connected to said nozzles, an output conduit intermediate the opening of said position sensing nozzle and said source of constant pneumatic pressure, said sensing nozzle operable to produce through said output conduit a pneumatic output signal responsive to a torque received by the missile and representative of the displacement of said rotor from its normal plane, pneumatic means connected to said output conduit for differentiating the first pneumatic signal to produce a second pneumatic signal representative of the rate of displacement of said rotor, pneumatic means connected to said output conduit and said differentiating means for summing the first and second pneumatic signals, servo regulator means operatively connected to the output of said summing means, and a pair of laterally and oppositely directed thrust jets fixed on the missile, operatively connected to and controlled by said servo regulator for providing a corrective torque to the missile in a direction opposite and magnitude equal to the initial torque received by the missile.

7. A pneumatic system for maintaining the predetermined attitude of a missile in flight comprising a rotor of a gyroscope mounted for rotation in a normal plane about a spin axis on the missile, said rotor having a planar surface normal to its axis of rotation, a balancing nozzle and a sensing nozzle mounted on the missile, having their openings directed against said planar surface at points diametrically opposite and equally spaced from the spin axis of said rotor, a source of constant pneumatic pressure operatively connected to said nozzles, an output conduit intermediate the opening of said position sensing nozzle and said source of constant pressure, said sensing nozzle operable to produce through said output conduit a pneumatic output signal responsive to a torque received by the missile and representative of the displacement of said rotor from its normal plane, pneumatic means connected to said output conduit for differentiating the first pneumatic signal to produce a second pneumatic signal representative of the rate of displacement of said rotor, pneumatic means connected to said output conduit and said differentiating means for summing the first and second pneumatic signals, servo regulator means operatively connected to the output of said summing means, and a pair of laterally and oppositely directed thrust jets fixed on the missile, operatively connected to and controlled by said servo regulator means for providing a corrective torque to the missile in a direction opposite and magnitude equal to the initial torque received by the missile.

8. A system for maintaining the predetermined attitude of a missile in flight comprising control means movable from a normal position in response to a force causing deviation of the missile from its predetermined attitude, pneumatic sensing means mounted stationary on the missile and operable to produce a first pneumatic signal representative of the displacement of said control means, pneumatic balancing means operatively connected to said control means and cooperable with said sensing means to maintaining the balance of said control means in its normal position, means operatively connected to said pneumatic sensing means for differentiating the first pneumatic signal to produce a second pneumatic signal representative of the rate of displacement of said control means, means operatively connected to said pneumatic sensing means and said pneumatic differentiating means for summing the first and second pneumatic signals, pneumatic servo regulator means operatively connected to the output of said summing means, and means operatively connected to and controlled by the output of said servo regulator means for providing a corrective force to the missile in a direction opposite and of a magnitude equal to the initial force causing deviation of the missile.

References Cited by the Examiner

UNITED STATES PATENTS

| | | | |
|---|---|---|---|
| 1,592,081 | 7/26 | Colvin | 244—79 X |
| 2,896,883 | 7/59 | Andeen | 244—77 |
| 2,974,594 | 3/61 | Boehm | 244—76 |

FOREIGN PATENTS 860,485　2/61　Great Britain.

OTHER REFERENCES

Control Engineering, September 1954, pp. 58–63.

MILTON BUCHLER, *Primary Examiner.*

ANDREW H. FARRELL, *Examiner.*